United States Patent [19]

Hodshire

[11] 4,434,573

[45] Mar. 6, 1984

[54] FISHING APPARATUS

[76] Inventor: Vincent B. Hodshire, 2701 NE. Adams St., Peoria, Ill. 61603

[21] Appl. No.: 418,684

[22] Filed: Sep. 16, 1982

[51] Int. Cl.³ .................. A01K 91/06; A01K 97/12
[52] U.S. Cl. ............................................. 43/15
[58] Field of Search ..................... 43/15, 16, 96, 97

[56] References Cited

U.S. PATENT DOCUMENTS

| | | | |
|---|---|---|---|
| 3,412,499 | 11/1968 | Pastrovich | 43/15 |
| 4,270,298 | 6/1981 | Hodshire | 43/15 |
| 4,321,767 | 3/1982 | Hodshire | 43/15 |
| 4,393,615 | 7/1983 | Hodshire | 43/15 |

*Primary Examiner*—Nicholas P. Godici
*Assistant Examiner*—P. Weston Musselman
*Attorney, Agent, or Firm*—James R. Bell

[57] ABSTRACT

Fish can lightly nibble bait off a hook before a fisherman becomes aware and is able to react by firmly setting the hook in the fish. Apparatus is provided for reacting to a fish lightly nibbling at the bait in a manner sufficient to swiftly jerk the hook thus firmly setting it in the fish's mouth. The apparatus can be used for ice fishing or can be hand held in the conventional manner for water fishing. The hook can be set for fishing at various depths.

2 Claims, 3 Drawing Figures

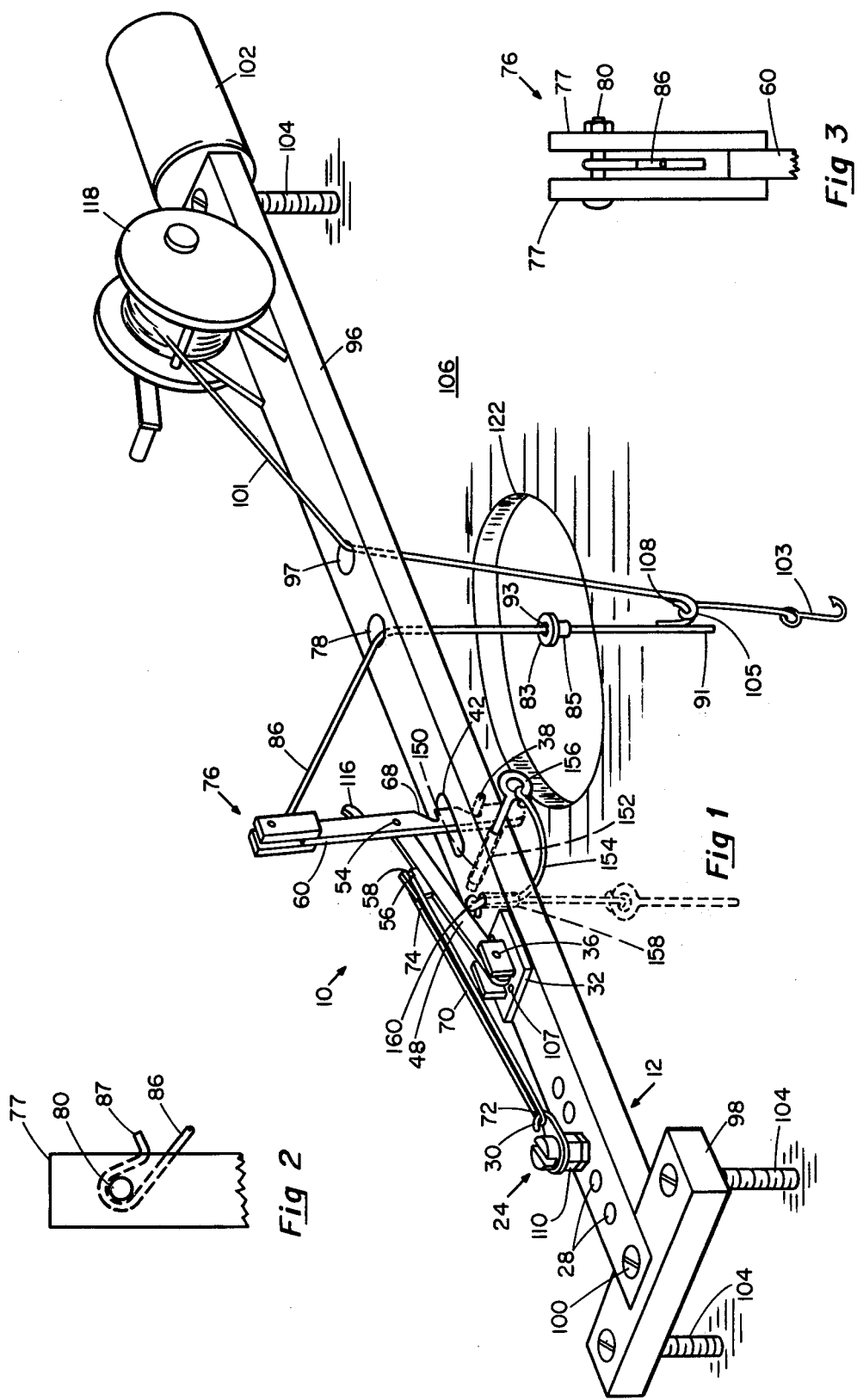

FISHING APPARATUS

BACKGROUND OF THE INVENTION

This invention relates generally to fishing and more particularly to automatic hookers or catchers.

Fishing apparatus of the type including spring loaded, presettable fish hook setting devices have limitations such as being expensive, complex, and somewhat enreliable. Also, in a desire to provide such an apparatus that is sensitive enough to be sprung or set off in response to a fish lightly nibbling at a baited hook, such devices are often tripped or set off prematurely. A further limitation of such devices is that they usually do not allow for setting the fish hook at various depths.

The foregoing illustrates limitations of the known prior art. Thus, it is apparent that it would be advantageous to provide an alternative directed to overcoming one or more of the limitations as set forth above. Accordingly, a suitable alternative is to provide a presettable, spring loaded, fish hooking apparatus that is inexpensive, reliable, non-complex, and allows for presetting the fish hook at various depths.

SUMMARY OF THE INVENTION

In one aspect of the present invention, this is accomplished by providing a fishing apparatus including a main support member having a first member connected to move between first and second positions. A trigger is connected to the first member and can be retained in the first position. A resilient member is connected for urging the trigger toward the second position. A pair of guides are formed in the main support and a reel is mounted on the main support. A wire is connected to the trigger and extends through one of the guides. A fishing line extends from the reel and through the other guide. Means are provided on the wire for releasably engaging the fishing line. Means are also provided for locking the trigger in the first position.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is an isometric view illustrating an embodiment of the present invention;

FIG. 2 is a partial side view illustrating an embodiment of a portion of the invention; and FIG. 3 is a partial end view illustrating an embodiment of the portion of this invention illustrated in FIG. 2.

DESCRIPTION OF THE PREFERRED EMBODIMENT

Fishing apparatus 10 includes a main support member 12 which is preferably formed of wood members 96, 98 joined in a "T" shape at bolt 100 and having a handle 102. Support legs such as bolts 104 extend through main support 12 for supporting apparatus 10 on an ice surface 106. In this manner, when apparatus 10 is to be used for water fishing, main support member 12 can be hand held at handle 102, and, when apparatus 10 is to be used for ice fishing, the apparatus is supported above ice surface 106 by legs 104.

A first member 48 is pivotally connected to member 12 at pivot pin 36 and plate 32 which is suitably attached to member 12 by wood screws 107, or the like. A plate 56 is suitably attached to member 48 and includes a slot 58.

A trigger 60 is pivotally connected to member 48 at a pivot pin 54 and includes notches 68. A pin 38, attached to member 12 functions as a means for retaining member 48 and trigger 60 in a first position. This is accomplished by inserting trigger 60 through an opening 42 in member 12 so that one of the notches 68 engages pin 38.

A bolt 24 is inserted through one of a plurality of holes 28 in member 12. Bolt 24 is thus adjustably mounted on member 12. For added adjustment, nuts 110 can be used to adjust the distance between a hook 30 and member 12. A wing nut (not shown) secures bolt 24 to member 12.

A resilient means such as a rubber band 70 includes a first end 72 engaged in hook 30, and a second end 74 engaged in slot 58. When slot 68 and pin 38 disengage, resilient means 70 urges member 48 and trigger 60 from the first position to a second position wherein trigger 60 is withdrawn from opening 42.

Trigger 60 includes an extension 76 comprising a pair of spaced apart members 77 of a suitable metal preferably welded to trigger 60. An axle 80 extends through members 77. Axle 80 may be a metal pin press fit into position as illustrated in FIGS. 1 and 2 or may be a removable bolt and nut as illustrated in FIG. 3.

A spring steel wire 86 has a first end 87 looped around 80, see FIG. 2. Thus, loop 87 may be forced open to release wire 86 from axle 80. Where axle 80 is a bolt and nut as shown in FIG. 3, the axle 80 may be removed if desired. In either case wire 86 is releasably connected to axle 80. Wire 86 extends through a guide 78 formed in member 12 and terminates at an end 91.

First and second limiting means 83, 85, respectively, are carried by wire 86. First limiting means 83 is preferably a washer and wire 86 moves freely through an opening 93 in the washer. Second limiting means 85 is a bead, weld, or a suitable protuberance formed on wire 86 and is larger in diameter than opening 93 so that bead 85 cannot pass through opening 93. Washer 83 is larger in diameter than guide 78.

A second guide 97 similarly formed in member 12, is adjacent a well-known fishing reel 118 also connected to support 12.

A fishing line 101 is extendably connected to reel 118 and extends through guide 97 so as to be adjacent hook portion 108 of wire 86. Line 101 ultimately terminates at a fishing hook 103.

In this manner, an overhead loop 105 can be formed in line 101 to set hook 103 at any desired depth. The overhand loop 105 can be engaged with hook portion 108 of wire 86. Thus, hook portion 108 functions as a means connected to wire 86 for releasably engaging fishing line 101.

A probe 116 is attached to and extends from trigger 60 to be used for "tip-up" fishing.

Means, such as a lock pin 150, are provided for releasably locking trigger 60 in the first position so that trigger 60 cannot be moved out of engagement with pin 38. An aperture 152 extends through main support member 12 adjacent pin 38 so as to permit lock pin 150 to be urged through aperture 152 (as in a press-fit) and simultaneously extend through opening 42. A flexible member 154 such as a wire or suitable cord, is connected at one end to a loop 156 of lock pin 150 and at another end to support member 12. For example, member 154 can extend through an aperture 158 in member 12 and a knot 160 formed in member 154 can retain lock pin 150 hanging freely in proximity with trigger 60 when pin 150 is released from aperture 152.

With the parts assembled as set forth above, it can be appreciated that with an overhand loop 105 formed in line 101 and engaged with hook portion 108 of wire 86, and with trigger 60 set in the first position with one of the notches 68 engaged with pin 38, apparatus 10 is poised to jerk and set fishing hook 103 in a fish's mouth when the wire and fishing line 86, 101, respectively, are moved a sufficient amount after a "strike" so that notch 68 disengages pin 38 and resilient means 70 pivotally snaps trigger 60 to the second position. Since overhand loop 105 functions as a releasable engagement of line 101 and hook portion 108, line 101 easily releases from engagement with hook portion 108 in response to line 101 being retracted through guide 97 by actuation of reel 18. Wire 86 is limited in movement due to limiting means 83, 85 engaging each other and limiting means 83 engaging support member 12.

Apparatus 10 is supported by legs 104 on the surface 106 as illustrated in FIG. 1. When it is desired to use apparatus 10 for "tip-up" fishing, as it is commonly referred to, overhand loop 105 can be engaged with probe 116 rather than with hook 108. Line 101 will still extend through guide 97 and into the water beneath ice 106. Force exerted on line 101 will act on probe 116 to pivot trigger 60 and disengage slot 68 and pin 38. Thus, trigger 60 will be released to the second position.

The foregoing has described a presettable, spring loaded, fish hooking apparatus that is inexpensive, reliable, non-complex, and allows for presetting the fish hook at various depths.

It is anticipated that aspects of the present invention, other than those specifically defined in the appended claims, can be obtained from the foregoing description and the drawings.

Having thus described the invention, what is claimed is:

1. A fishing apparatus comprising:
 a main support member;
 a first member connected to said main support and movable between first and second positions;
 a trigger member connected to said first member;
 an extension connected to said trigger, said extension including a pair of spaced apart members having an axle extending therethrough;
 means for retaining said trigger and said first member in said first position;
 means for resiliently urging said trigger and said first member toward said second position;
 a first guide in said main support;
 a wire releasably connected to said axle and extending through said first guide;
 first and second limiting means carried by said wire for limiting movement of said wire through said guide in response to said second limiting means engaging said first limiting means and said first limiting means engaging said main support member;
 a reel mounted on said main support;
 a second guide in said main support;
 a fishing line extendably connected to said reel and extending through said second guide;
 means connected to said wire for releasably engaging said second line; and
 means for releasably locking said trigger in said first position, said means including a lock pin urged through an aperture formed in said main support member adjacent said means for retaining said trigger.

2. The apparatus of claim 1 including:
 means for connecting said lock pin to said main support member, said means for connecting being flexible and of a construction sufficient for retaining said lock pin in proximity with said trigger.

* * * * *